April 21, 1953  P. O. DAVOLT  2,635,796
PARCEL TIE FOR AUTOMOBILES
Filed Feb. 28, 1951
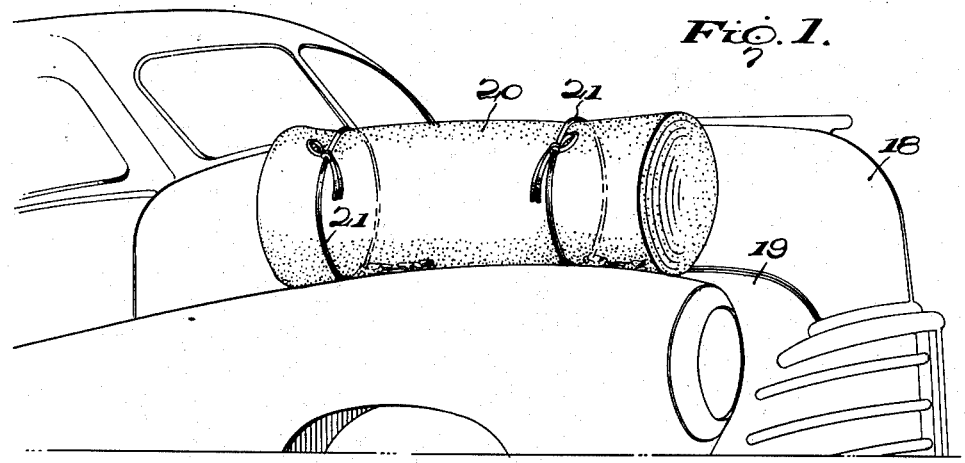
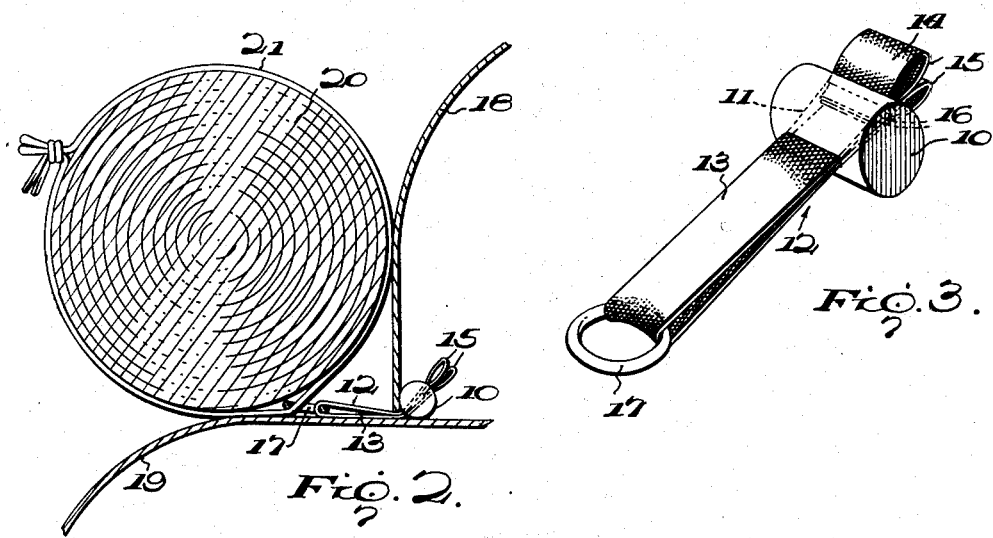
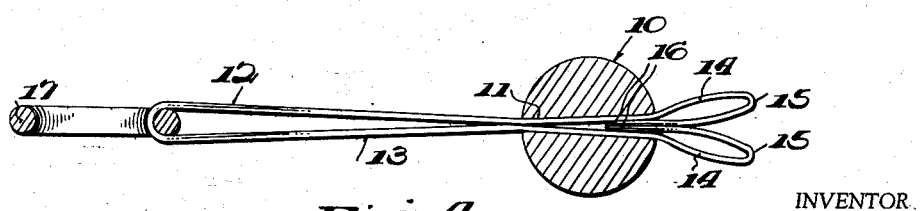
INVENTOR.
P. O. Davolt.
BY Thos. H. Johnston
ATTORNEY Patented Apr. 21, 1953

2,635,796

UNITED STATES PATENT OFFICE 2,635,796

PARCEL TIE FOR AUTOMOBILES

Pembroke O. Davolt, Longview, Wash.

Application February 28, 1951, Serial No. 213,258

4 Claims. (Cl. 224—42.31)

This invention relates to an improved parcel tie for automobiles.

As will be appreciated, it is often desired to carry by automobile a parcel, package, bundle, or the like too large, too long, or too unwieldy to place inside of the automobile, so that, not infrequently, various objects are hastily tied in makeshift manner to the outside of a car with resultant accidental loss of the object, injury thereto, or scratching of the finish of the car.

It is therefore an object of the present invention to provide a device one or more of which may be easily and quickly attached to an automobile without the necessity for any structural change in the car, and by means of which a parcel or the like may be securely tied to the automobile at the outside thereof.

A further object of the invention is to provide a device wherein, after the device has served its purpose, it may be readily detached from the automobile and conveniently carried in the car ready to be again used when needed.

Another object of the invention is to provide a device embodying a head adapted to lie at the inner side of the body of the car adjacent a joint between coacting fixed and hinged parts of the body for anchoring the device to the car, a flexible sling adapted to extend through said joint, and a ring carried by said sling at the exterior of the body of the car and adapted to receive an appropriate tie-rope or the like.

And the invention seeks, as a still further object, to provide a device wherein the sling may be easily and quickly adjusted for varying the effective length thereof.

Other and incidental objects of the invention will appear during the course of the following description thereof, and in the drawings:

Figure 1 is a perspective view showing the manner in which a bundle may be tied to an automobile by means of my improved device.

Figure 2 is a transverse sectional view more particularly showing how the device is connected with the automobile.

Figure 3 is a detail perspective view of the device.

Figure 4 is a section taken longitudinally of the device.

In carrying the invention into effect, I employ a head 10 which may be of any approved material and shape. In the present instance, I have shown the head as being composed of a more or less short cylinder of wood, and formed in the head medially thereof is a diametric V-shaped slot 11 gradually tapered from end to end.

In conjunction with the head 10, I employ a flexible sling 12. This sling preferably comprises a pliable strap 13 of canvas, leather or the like looped to form the sling. However, the strap should, in any event, be flat and more or less thin.

As best seen in Figure 4 of the drawings, the end portions of the strap 13 are inserted in overlapping relation through the slot 11 of the head 10 from the narrow end of said slot, when the extremities 14 of the strap are flexed toward each other to form loops 15. The terminals 16 of the strap are then inserted in overlapping relation into the wide end of the slot 11 between the extremities 14 of the strap. The terminals of the strap thus form a wedge lying in the wide end of the slot 11 between the extremities 14 of the strap, so that when pull is exerted upon the free end of the sling 12, the four thicknesses of the strap lying in the wide end of the slot 11 will be caused to jam and lock therein.

The end portions of the strap 13 are thus firmly but detachably connected with the head 10 so that if the strap should become worn, a new strap may be readily substituted therefor. As will be observed, the slot 11 is of a width to snugly receive the width of the strap so that a secure connection between the strap and head is provided. Furthermore, as will be appreciated, as pull upon the sling 12 is increased, the wedge provided by the terminals 16 of the strap will tend to shift further toward the narrow end of the slot 11 for increasing the binding action of the wedge and tightening the connection between the strap and head.

Freely connected with the sling 12 is a grommet which may be of any preferred shape and size and, in the present instance, is shown as being formed of a metal ring 17. This ring freely receives the strap 13 therethrough so that the ring will readily slide on the strap and conform to any angle assumed by the sling. Likewise, a tie-rope, cord or the like will readily slide against the ring when threaded therethrough.

In Figures 1 and 2 of the drawings, I have shown my improved device in use. The hood of a conventional automobile is indicated at 18, and the apron of one of the front fenders at 19. As is usual, the hood is appropriately hinged so that it may be raised, while, normally, the hood is secured in lowered closed position. A bundle to be carried on the automobile is conventionally indicated at 20, while short ropes or the like for securing the bundle are indicated at 21.

To install the present device, the hood 18 is raised, when one or more of the devices, say a pair thereof, are positioned upon the apron 19 in the manner shown in Figure 2 of the drawings, so that the heads 10 of said pair of devices will lie inwardly of the normal line of junction of the hood and apron, while the rings 17 will lie outwardly of said line. The hood is then closed and secured in lowered position. Thus, the heads 10 of the pair of devices are disposed at the inside of the hood blocked by the parts against outward displacement through the joint between the hood and apron, while the slings 12 extend beneath the adjacent edge of the hood through said joint to freely support the ring 17 at the exterior of the hood. The pair of devices is accordingly anchored to the automobile by the heads 10, and as the straps 13 are not thick, the presence of the slings 12 beneath the adjacent edge of the hood will not hamper the closing of the hood nor impose any undue strain thereon.

Having connected the pair of devices with the automobile, as above described, the ropes 21 are threaded through the rings 17 thereof, when the bundle 20 is laid upon the apron 19 against the hood 18. The ropes are then passed around the bundle and each tied at its ends for firmly and detachably securing the bundle in place. As will be perceived, the ropes 21 will, when the bundle is being tied, readily slide through the rings 17 of the pair of devices to facilitate tying of the bundle. Also, as will be appreciated, the slings 12 of said pair of devices will flex, while the rings 17 will ride along the straps 13 to conform to any angle of pull of the ropes.

It is now to be noted that the effective length of the slings 12 may be readily adjusted simply by pulling the terminals 16 of the strap 13 from the wide end of the slot 11 of the head 10, when the strap may be freely drawn through said slot, in either one direction or the other, to either lengthen or shorten the sling, when said terminals may be replaced in the wide end of the slot to wedge the strap in adjusted position. Thus, the effective length of the sling may be adjusted easily and quickly, and it may be noted that the feature has proven of great practical convenience in that the rings 17 of say a pair of the devices, as above described, may be rendered readily accessible regardless of the angle between the hood and fender aprons of an automobile, or the cramped space between such parts.

Having thus described my invention, I claim:

1. A parcel tie for automobiles including a head adapted to be disposed at the inner side of a normally closed joint between coacting fixed and hinged parts of the body of an automobile, said head being blocked by said parts against outward displacement through said joint, a limp flexible element carried by the head and of a slim, flat thickness permitting said element to extend between said parts at said joint to the outer side of the body and anchored to the body by said head, and a grommet carried by the free end of said element and adapted to have a flexible member threaded therethrough for tying an object to the automobile outside of the body thereof.

2. A parcel tie for automobiles including a head adapted to be disposed at the inner side of a normally closed joint between coacting fixed and hinged parts of the body of an automobile, said head being blocked by said parts against outward displacement through said joint, a flat, thin, limp strap connected at its end to the head to form a loop having its end portions overlapping, the overlapping end portions of the loop being of a combined slim thickness permitting said end portions to extend in abutting relation between said parts at said joint to the outer side of the body and anchored to the body by said head, and a ring having said strap extending loosely therethrough and freely carried by said loop, said ring being adapted to have a flexible member threaded therethrough for tying an object to the automobile outside of the body thereof.

3. In a parcel tie for automobiles, the combination of a flat, limp strap having its extremities disposed in overlapping relation to form the strap into a loop, a grommet freely carried by said loop and coacting therewith to form a sling, and a head detachably connected to said sling and adapted to anchor the sling when the tie is in use, said head being provided with a tapered V-shaped slot therethrough of a dimension to snugly accommodate the width of the strap and receiving the overlapping extremities of said strap from the narrow end of the slot, both ends of said strap being positioned in the wide end of the slot between said extremities and abutting to form a wedge resting flat against said extremities and providing a sole locking means adapted when shifted toward the narrow end of the slot to bind and lock at said wedge both of said extremities fixed in the slot.

4. A parcel tie for automobiles including a head having a V-shaped slot therethrough, and a flat, limp strap of a width to snugly fit in said slot and having its extremities inserted in overlapping relation through said slot from the narrow end thereof to form the strap into a loop connected to said head, the ends of the strap being returned into the wide end of the slot between the extremities of the strap and abutting to form a wedge resting flat against said extremities to bind therebetween and provide a sole locking means locking both extremities of the strap at said wedge fixed against forward pull toward the narrow end of the slot.

PEMBROKE O. DAVOLT.

References Cited in the file of this patent

UNITED STATES PATENTS

| Number | Name | Date |
| --- | --- | --- |
| 1,185,804 | Lane | June 6, 1916 |
| 1,496,142 | Wirkkala | June 3, 1924 |
| 2,518,538 | Giblin | Aug. 15, 1950 |
| 2,522,719 | Johnson | Sept. 19, 1950 |